(12) United States Patent
Han et al.

(10) Patent No.: US 11,660,636 B2
(45) Date of Patent: May 30, 2023

(54) ALUMINUM ALLOY COATING, ALUMINUM ALLOY WHEEL HUB AND SPRAYING METHOD OF ALUMINUM ALLOY WHEEL HUB

(71) Applicant: CITIC Dicastal CO., LTD., Hebei (CN)

(72) Inventors: Peng Han, Qinhuangdao (CN); Qingwang Wei, Qinhuangdao (CN); Yafei Song, Qinhuangdao (CN); Yongfeng Shu, Qinhuangdao (CN); Jian Zhang, Qinhuangdao (CN); Kun Gu, Qinhuangdao (CN); Yu Liu, Qinhuangdao (CN); Jian Li, Qinhuangdao (CN)

(73) Assignee: CITIC DICASTAL CO., LTD., Hebei (CN)

( * ) Notice: Subject to any disclaimer, the term of this patent is extended or adjusted under 35 U.S.C. 154(b) by 946 days.

(21) Appl. No.: 16/552,075

(22) Filed: Aug. 27, 2019

(65) Prior Publication Data

US 2020/0406295 A1  Dec. 31, 2020

(30) Foreign Application Priority Data

Jun. 25, 2019 (CN) .......................... 201910554547.9

(51) Int. Cl.
*B05D 7/00* (2006.01)
*B05D 1/00* (2006.01)
*B05D 1/02* (2006.01)
*B05D 1/12* (2006.01)
*B05D 1/36* (2006.01)
*B60B 27/00* (2006.01)

(52) U.S. Cl.
CPC .............. *B05D 7/572* (2013.01); *B05D 1/00* (2013.01); *B05D 1/02* (2013.01); *B05D 1/12* (2013.01); *B05D 1/36* (2013.01); *B60B 27/00* (2013.01); *B60B 2310/616* (2013.01); *B60B 2310/654* (2013.01); *B60B 2360/104* (2013.01); *B60B 2900/211* (2013.01); *B60B 2900/572* (2013.01)

(58) Field of Classification Search
CPC ... B05D 7/572; B60B 27/00; B60B 2310/616; B60B 2360/104
USPC ........................................................ 428/457
See application file for complete search history.

(56) References Cited

U.S. PATENT DOCUMENTS

2005/0067273 A1\* 3/2005 Goodrich .............. C23C 28/023
204/192.15

\* cited by examiner

*Primary Examiner* — Hui H Chin
(74) *Attorney, Agent, or Firm* — Cooper Legal Group, LLC

(57) ABSTRACT

The present disclosure provides an aluminum alloy coating, an aluminum alloy wheel hub and a spraying method of an aluminum alloy wheel hub. The aluminum alloy coating includes a base powder layer, a main body layer and a transparent powder layer from inside to outside. The main body layer includes at least two prime coat layers and at least two colored paint layers which are superposed in a preset order.

10 Claims, 2 Drawing Sheets

| Transparent powder layer |
|---|
| Second colored paint layer |
| Second prime coat layer |
| First prime coat layer |
| First colored paint layer |
| Base powder layer |

FIG. 1

ALUMINUM ALLOY COATING, ALUMINUM ALLOY WHEEL HUB AND SPRAYING METHOD OF ALUMINUM ALLOY WHEEL HUB

CROSS-REFERENCE TO RELATED APPLICATIONS

This application claims priority to Chinese Patent Application No. 201910554547.9, filed on Jun. 25, 2019, the contents of which are hereby incorporated by reference in its entirety.

BACKGROUND

An aluminum alloy wheel hub (hereinafter referred to as the wheel hub) of an automobile needs to be subjected to surface treatment after being machined, so as to form a surface protective layer, which makes the wheel hub be higher in corrosion resistance and have a more beautiful appearance.

In the related art, the surface treatment of the wheel hub mainly adopts oil paint spraying, because this mode has the advantages of simple implementation, high qualification rate, low cost and the like when compared with processes of laser engraving, color registration, finishing, polishing, etc. However, the corrosion resisting effect of the oil paint spraying is not good enough in the existing spraying process, and the appearance is not beautiful enough.

SUMMARY

The present disclosure relates to metal surface treatment, and more particularly relates to an aluminum alloy coating, an aluminum alloy wheel hub and a spraying method of an aluminum alloy wheel hub.

The present disclosure provides an aluminum alloy coating, an aluminum alloy wheel hub and a spraying method of an aluminum alloy wheel hub, so as to achieve a better corrosion resistance effect and a more beautiful appearance.

In one aspect, the present disclosure provides an aluminum alloy coating. The aluminum alloy coating includes a base powder layer, a main body layer and a transparent powder layer from inside to outside. The main body layer includes at least two prime coat layers and at least two colored paint layers which are superposed in a preset order.

In one embodiment, the main body layer includes a first colored paint layer, a first prime coat layer, a second prime coat layer and a second colored paint layer from inside to outside.

In one embodiment, the first colored paint layer and the second colored paint layer are 10 to 20 microns in thickness.

In one embodiment, the first prime coat layer and the second prime coat layer are 20 to 40 microns in thickness.

In another aspect, the present disclosure further provides an aluminum alloy wheel hub. The surface of the aluminum alloy wheel hub includes any aluminum alloy coating described above.

In a further aspect, the present disclosure further provides a spraying method of an aluminum alloy wheel hub. The method is applied to the above aluminum alloy wheel hub. The method includes the following steps:

spraying base powder to a pretreated surface of an aluminum alloy wheel hub to form a base powder layer;

spraying a first colored paint to the base powder layer to form a first colored paint layer;

spraying a first prime coat to the first colored paint layer to form a first prime coat layer;

spraying a second prime coat to the first prime coat layer to form a second prime coat layer;

spraying a second colored paint to the second prime coat layer to form a second colored paint layer; and spraying transparent powder to the second colored paint layer to form a transparent powder layer.

In one embodiment, before spraying the base powder to the pretreated surface of the aluminum alloy wheel hub, the method also includes: pretreating the surface of the aluminum alloy wheel hub, and the pretreatment at least includes degreasing, water washing, acid washing, pure water washing, passivation and blocking.

In one embodiment, the spraying of the first colored paint to the base powder layer and the spraying of the second colored paint to the second prime coat layer each include:

performing the spraying through an air gun under conditions of a distance of 180 to 250 mm between a spraying port and the surface to be sprayed, an atomization pressure of 2.0 to 4.0 bar of the air gun, a fan pressure of 1.0 to 4.0 bar, a paint dispensing rate of 50 to 300 cc/min, a temperature of 55 to 65° C. of the surface to be sprayed, a curing temperature of 130 to 150° C. and a heat preservation time of 15 to 25 min.

In one embodiment, the spraying of the first prime coat to the first colored paint layer and the spraying of the second prime coat to the first prime coat layer each include:

performing the spraying through a rotating cup gun under conditions of a distance of 180 to 250 mm between a spraying port and the surface to be sprayed, a paint dispensing rate of 50 to 250 cc/min, a driving air pressure of 1.0 to 2.0 bar, a fan pressure of 1.0 to 2.0 bar, a static voltage of 30 to 60 kV, a temperature of 40 to 50° C. of the surface to be sprayed, a curing temperature of 140 to 160° C. and a curing time of 10 to 15 min.

In one embodiment, the spraying of the base powder on the pretreated surface of the aluminum alloy wheel hub and the spraying of the transparent powder on the second colored paint layer each include:

performing electrostatic spraying under conditions of an electrostatic voltage of 30 to 80 kV, a powder spraying amount of 35 to 80%, a total gas volume of 3.5 to 5.0 m/h, a distance of 180 to 250 mm between a spraying port and the surface to be sprayed, a curing temperature of 170 to 180° C. and a curing time of 15 to 20 min.

According to the aluminum alloy coating, the aluminum alloy wheel hub and the spraying method of the aluminum alloy wheel hub which are provided by the embodiments of the present disclosure, by the arrangement of the main body layer formed by superposing the at least two colored paint layers and the at least two prime coat layers according to the preset order, a better corrosion resistance effect and a more beautiful appearance can be achieved.

Other beneficial effects of the embodiments of the present disclosure will be further described in conjunction with specific technical solutions in the specific implementations.

BRIEF DESCRIPTION OF THE DRAWINGS

FIG. 1 is a structural schematic diagram of an aluminum alloy coating according to the embodiment of the present disclosure.

DETAILED DESCRIPTION

Figure 2:
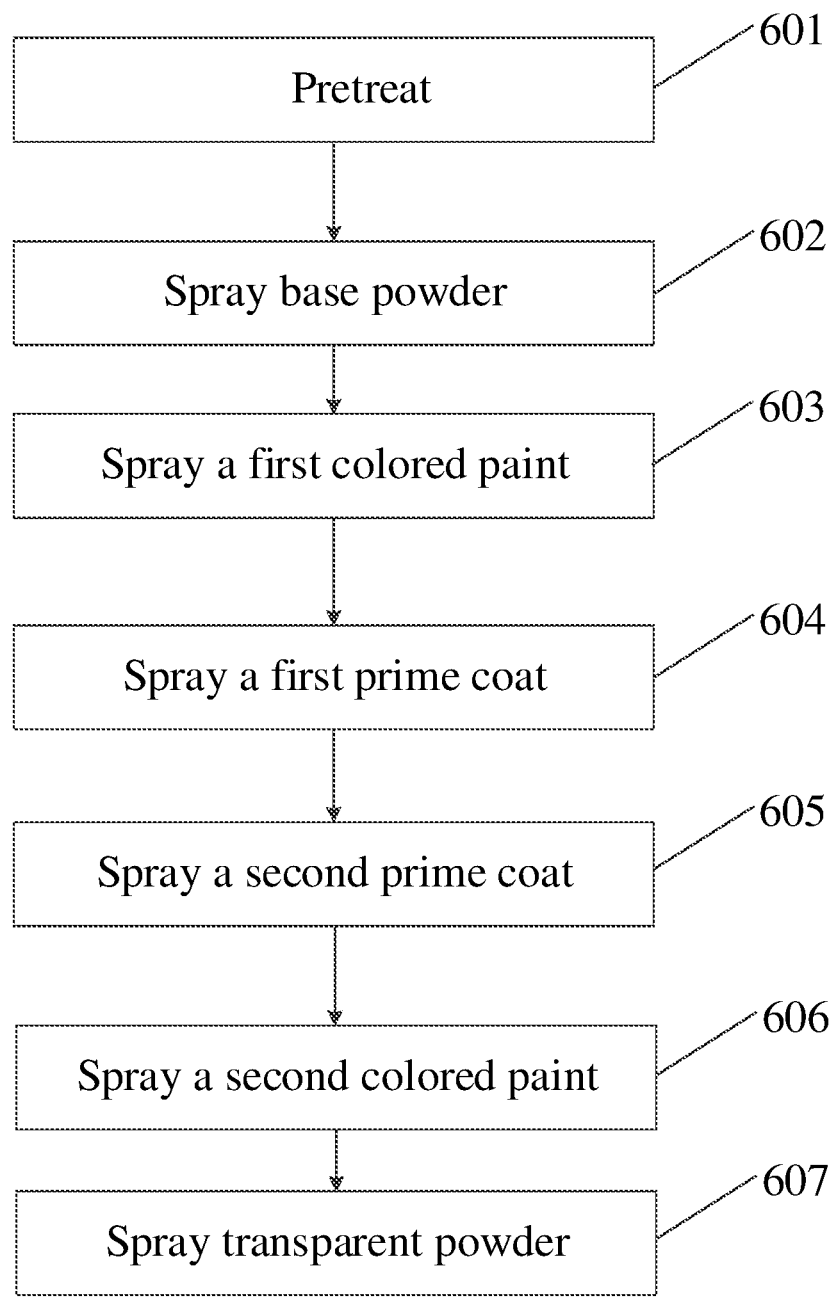
FIG. 2 is a flow diagram of a spraying method of an aluminum alloy wheel hub according to the embodiment of the present disclosure.

The embodiment of the present disclosure provides an aluminum alloy coating. The aluminum alloy coating is applied to both an aluminum alloy wheel hub and other automobile accessories, and can be further applied to elements of electronic equipment.

The aluminum alloy coating includes a base powder layer, a main body layer and a transparent powder layer from inside to outside. The main body layer includes at least two prime coat layers and at least two colored paint layers which are superposed in a preset order.

The aluminum alloy coating provided by the embodiment of the present disclosure has a better corrosion resistance effect and is more beautiful.

In one implementation, the main body layer includes a first colored paint layer, a first prime coat layer, a second prime coat layer and a second colored paint layer from inside to outside. Therefore, the better corrosion resistance effect and more beautiful appearance are achieved, and the cost is relatively low. This is a preferred mode.

In one embodiment, the first colored paint layer and the second colored paint layer are 10 to 20 microns in thickness. Therefore, the better corrosion resistance effect is achieved. This is a preferred mode.

In one embodiment, the first prime coat layer and the second prime coat layer are 20 to 40 microns in thickness. Therefore, the better corrosion resistance effect is achieved. This is a preferred mode.

In one embodiment, in the first prime coat layer and the second prime coat layer, the prime coat may be a transparent prime coat. Therefore, the colored paint layers are not affected, and this is a preferred mode.

The embodiment of the present disclosure further provides an aluminum alloy wheel hub. The surface of the aluminum alloy wheel hub includes any one of the above aluminum alloy coatings.

The embodiment of the present disclosure further provides a spraying method of an aluminum alloy wheel hub. The method is applied to the above aluminum alloy wheel hub. The method includes the following steps that:

the surface of the aluminum alloy wheel hub is pretreated;

base powder is sprayed to the pretreated surface of the aluminum alloy wheel hub to form a base powder layer;

a first colored paint is sprayed to the base powder layer to form a first colored paint layer;

a first prime coat is sprayed to the first colored paint layer to form a first prime coat layer;

a second prime coat is sprayed to the first prime coat layer to form a second prime coat layer;

a second colored paint is sprayed to the second prime coat layer to form a second colored paint layer; and transparent powder is sprayed to the second colored paint layer to form a transparent powder layer.

In one embodiment, before the base powder is sprayed to the pretreated surface of the aluminum alloy wheel hub, the method also includes that: the surface of the aluminum alloy wheel hub is pretreated, and the pretreatment at least includes degreasing, water washing, acid washing, pure water washing, passivation and blocking. Therefore, the surface to be sprayed is cleaner and more easily combined with the base powder layer.

Specifically, in order to make the pretreatment effect better, the water washing, the pure water washing and the like in the above step may be performed for multiple times. For example, in actual production, the pretreatment may include: precleaning, predegreasing, main degreasing, primary water washing, secondary water washing, acid washing, primary pure water washing, secondary pure water washing, passivation, third pure water washing, closing, fourth pure water washing, fifth pure water washing and drying.

In one embodiment, the spraying of the first colored paint to the base powder layer and the spraying of the second colored paint to the second prime coat layer each include that:

the spraying is performed through an air gun under conditions of a distance of 180 to 250 mm between a spraying port and the surface to be sprayed, an atomization pressure of 2.0 to 4.0 bar of the air gun, a fan pressure of 1.0 to 4.0 bar, a paint dispensing rate of 50 to 300 cc/min, a temperature of 55 to 65° C. of the surface to be sprayed, a curing temperature of 130 to 150° C. and a heat preservation time of 15 to 25 min.

The first colored paint and the second colored paint are both colored paints possibly different in color, but consistent in material, so that the same process parameters may be adopted, which are preferred process parameters and have the advantages of more uniform spraying, firmer curing, beautiful color and the like.

In one embodiment, the spraying of the first prime coat to the first colored paint layer and the spraying of the second prime coat to the first prime coat layer each include that:

the spraying is performed through a rotating cup gun under conditions of a distance of 180 to 250 mm between a spraying port and the surface to be sprayed, a paint dispensing rate of 50 to 250 cc/min, a driving air pressure of 1.0 to 2.0 bar, a fan pressure of 1.0 to 2.0 bar, a static voltage of 30 to 60 kV, a temperature of 40 to 50° C. of the surface to be sprayed, a curing temperature of 140 to 160° C. and a curing time of 10 to 15 min.

The first prime coat and the second prime coat are both prime coats possibly different in color, but consistent in material, so that the same process parameters may be adopted, which are preferred process parameters and have the advantages of more uniform spraying, firmer curing and the like.

In one embodiment, the spraying of the base powder to the pretreated surface of the aluminum alloy wheel hub and the spraying of the transparent powder to the second colored paint layer each include that:

electrostatic spraying is performed under conditions of an electrostatic voltage of 30 to 80 kV, a powder spraying amount of 35 to 80%, a total gas volume of 3.5 to 5.0 m/h, a distance of 180 to 250 mm between a spraying port and the surface to be sprayed, a curing temperature of 170 to 180° C. and a curing time of 15 to 20 min.

Although the base powder and the transparent powder are of different materials, they have similar properties, so that the same process parameters may be adopted to make the operation easier. The parameters are preferred process parameters and have the advantages of uniform spraying, firm curing, more beautiful appearance and the like.

Detailed technical solutions of the present disclosure will be described below in combination with accompanying drawings and specific Examples. It should be understood that the attached drawings and the Examples are merely explanatory of the present disclosure, but not intended to limit the present disclosure.

Example 1

The present Example provides an aluminum alloy wheel hub. The surface of the aluminum alloy wheel hub includes an aluminum alloy coating. As shown in FIG. 1, the aluminum alloy coating includes a base powder layer, a first colored paint layer, a first prime coat layer, a second prime coat layer, a second colored paint layer and a transparent powder layer from inside to outside, namely from bottom to top in the figure.

The first colored paint layer and the second colored paint layer are 15 microns in thickness.

The first prime coat layer and the second prime coat layer are 25 microns in thickness.

The material of the base powder layer is mixed polyester epoxy powder, and the material of the transparent powder layer is acrylic acid powder.

Example 2

The present Example also provides an aluminum alloy wheel hub. In the present Example, the aluminum alloy wheel hub is identical with Example 1 except for the following contents.

In the present Example, the first colored paint layer and the second colored paint layer are 10 microns in thickness.

In the present Example, the first prime coat layer and the second prime coat layer are 40 microns in thickness.

Example 3

The present Example also provides an aluminum alloy wheel hub. In the present Example, the aluminum alloy wheel hub is identical with Example 1 except for the following contents.

In the present Example, the first colored paint layer and the second colored paint layer are 20 microns in thickness.

In the present Example, the first prime coat layer and the second prime coat layer are 20 microns in thickness.

Example 4

The present Example also provides an aluminum alloy wheel hub. In the present Example, the aluminum alloy wheel hub is identical with Example 1 except for the following contents.

In the present Example, the first colored paint layer and the second colored paint layer are 10 microns in thickness.

In the present Example, the first prime coat layer and the second prime coat layer are 20 microns in thickness.

Example 5

The present Example also provides an aluminum alloy wheel hub. In the present Example, the aluminum alloy wheel hub is identical with Example 1 except for the following contents.

In the present Example, the first colored paint layer and the second colored paint layer are 20 microns in thickness.

In the present Example, the first prime coat layer and the second prime coat layer are 40 microns in thickness.

Example 6

The present Example provides a spraying method of an aluminum alloy wheel hub. As shown in FIG. 2, the preparation method includes the following steps that:

Step 601: pretreatment. A surface to be sprayed is pretreated. The pretreatment includes: precleaning, predegreasing, main degreasing, primary water washing, secondary water washing, acid washing, primary pure water washing, secondary pure water washing, passivation, third pure water washing, blocking, fourth pure water washing, fifth pure water washing and drying.

Specifically, the passivation adopts chromate-free passivation, and a zirconium-titanium system agent is used.

Step 602: spraying of base powder. The base powder is sprayed to the pretreated surface to be sprayed to form a base powder layer. Specific process parameters are as follows: electrostatic spraying is adopted under conditions of an electrostatic voltage of 55 kV, a powder spraying amount of 60%, a total gas volume of 4.5 m/h, a distance of 200 mm between a spraying port and the surface to be sprayed, a curing temperature of 177° C. and a curing time of 17 min.

Step 603: spraying of a first colored paint. The first colored paint is sprayed to the surface of the base powder layer to form a first colored paint layer. Specific process parameters are as follows: the spraying is performed through an air gun under conditions of a distance of 200 mm between a spraying port and the surface to be sprayed, an atomization pressure of 3.0 bar of the air gun, a fan pressure of 2.0 bar, a paint dispensing rate of 180 cc/min, a temperature of 55 to 65° C. of the surface to be sprayed, a curing temperature of 140° C. and a heat preservation time of 20 min.

Step 604: spraying of a first prime coat. The first prime coat is sprayed to the first colored paint layer to form a first prime coat layer. Specific process parameters are as follows: the spraying is performed through a rotating cup gun under conditions of a distance of 200 mm between a spraying port and the surface to be sprayed, a paint dispensing rate of 180 cc/min, a driving air pressure of 1.6 bar, a fan pressure of 1.4 bar, a static voltage of 45 kV, a temperature of 40 to 50° C. of the surface to be sprayed, a curing temperature of 150° C. and a curing time of 12 min Step 605: spraying of a second prime coat. The second prime coat is sprayed to the first prime coat layer to form a second prime coat layer. Specific process parameters are the same as those in Step 604.

Step 606: spraying of a second colored paint. The second colored paint is sprayed to the second prime coat layer to form a second colored paint layer. Specific process parameters are the same as those in Step 603.

Step 607: spraying of transparent powder. The transparent powder is sprayed to the second colored paint layer to form a transparent powder layer. Specific process parameters are the same as those in Step 602.

Example 7

The present Example also provides a spraying method of an aluminum alloy wheel hub. All other parts of the technological process content are the same as those in Example 1 except that one part of the technological process content is different from that in Example 1. Only the different content is described below, and the flow diagram will not be shown separately.

In the present Example, in Step 602, the specific process parameters are as follows: an electrostatic voltage of 55 kV, a powder spraying amount of 35%, a total gas volume of 3.5 m/h, a distance of 180 mm between a spraying port and the surface to be sprayed, a curing temperature of 170° C. and a curing time of 15 min.

Example 8

The present Example also provides a spraying method of an aluminum alloy wheel hub. All other parts of the technological process content are the same as those in Example 1 except that one part of the technological process content is different from that in Example 1. Only the different content is described below, and the flow diagram will not be shown separately.

In the present Example, in Step 602, the specific process parameters are as follows: an electrostatic voltage of 80 kV, a powder spraying amount of 80%, a total gas volume of 5.0 m/h, a distance of 250 mm between a spraying port and the surface to be sprayed, a curing temperature of 180° C. and a curing time of 20 min.

Example 9

The present Example also provides a spraying method of an aluminum alloy wheel hub. All other parts of the technological process content are the same as those in Example 1 except that one part of the technological process content is different from that in Example 1. Only the different content is described below, and the flow diagram will not be shown separately.

In the present Example, in Step 603, the specific process parameters are as follows: a distance of 180 mm between a spraying port and the surface to be sprayed, an atomization pressure of 2.0 bar of the air gun, a fan pressure of 1.0 bar, a paint dispensing rate of 50 cc/min, a temperature of 55 to 65° C. of the surface to be sprayed, a curing temperature of 130° C. and a heat preservation time of 15 min.

Example 10

The present Example also provides a spraying method of an aluminum alloy wheel hub. All other parts of the technological process content are the same as those in Example 1 except that one part of the technological process content is different from that in Example 1. Only the different content is described below, and the flow diagram will not be shown separately.

In the present Example, in Step 603, the specific process parameters are as follows: a distance of 250 mm between a spraying port and the surface to be sprayed, an atomization pressure of 4.0 bar of the air gun, a fan pressure of 4.0 bar, a paint dispensing rate of 300 cc/min, a temperature of 55 to 65° C. of the surface to be sprayed, a curing temperature of 150° C. and a heat preservation time of 25 min.

Example 11

The present Example also provides a spraying method of an aluminum alloy wheel hub. All other parts of the technological process content are the same as those in Example 1 except that one part of the technological process content is different from that in Example 1. Only the different content is described below, and the flow diagram will not be shown separately.

In the present Example, in Step 604, the specific process parameters are as follows: a rotating cup gun being adopted for spraying, a distance of 180 mm between a spraying port and the surface to be sprayed, a paint dispensing rate of 50 cc/min, a driving air pressure of 1.0 bar, a fan pressure of 1.0 bar, a static voltage of 30 kV, a temperature of 40 to 50° C. of the surface to be sprayed, a curing temperature of 140° C. and a curing time of 10 min.

Example 12

The present Example also provides a spraying method of an aluminum alloy wheel hub. All other parts of the technological process content are the same as those in Example 1 except that one part of the technological process content is different from that in Example 1. Only the different content is described below, and the flow diagram will not be shown separately.

In the present Example, in Step 604, the specific process parameters are as follows: a rotating cup gun being adopted for spraying, a distance of 250 mm between a spraying port and the surface to be sprayed, a paint dispensing rate of 250 cc/min, a driving air pressure of 2.0 bar, a fan pressure of 2.0 bar, a static voltage of 60 kV, a temperature of 40 to 50° C. of the surface to be sprayed, a curing temperature of 160° C. and a curing time of 15 min.

In order to describe the technical effects of the aluminum alloy coating of the Example of the present disclosure, a Comparative Example is introduced. The Comparative Example is an aluminum alloy coating with a single layer of colored paint in the related art.

The multiple Examples of the present disclosure and the Comparative Example were subjected to a standard salt fog test, and test conditions were the same as test requirements in the aluminum alloy wheel hub industry, so descriptions thereof are omitted. Test results are as shown in Table 1:

TABLE 1

|  | Single-side corroded width (mm) | Double-side corroded width (mm) |
| --- | --- | --- |
| Comparative Example | 0.9 | 1.8 |
| Example 1 | 0.52 | 0.95 |
| Example 2 | 0.55 | 0.92 |
| Example 3 | 0.48 | 0.90 |
| Example 4 | 0.55 | 0.95 |
| Example 5 | 0.50 | 0.93 |

It can be seen from Table 1 that the corrosion resistance of the Examples of the present disclosure is much higher than that of the Comparative Example.

The above contents are only specific descriptions of the preferred Examples of the present disclosure, and not intended to limit the protection scope of the present disclosure. Any other equivalent transformations shall all fall within the protection scope of the present disclosure.

The invention claimed is:

1. An aluminum alloy coating, comprising a base powder layer, a main body layer and a transparent powder layer from inside to outside,
   wherein the main body layer comprises at least two prime coat layers and at least two colored paint layers which are superposed in a preset order.

2. The aluminum alloy coating according to claim 1, wherein the main body layer comprises a first colored paint layer of the at least two colored paint layers, a first prime coat layer of the at least two prime coat layers, a second prime coat layer of the at least two prime coat layers and a second colored paint layer of the at least two colored paint layers from inside to outside.

3. The aluminum alloy coating according to claim 2, wherein the first colored paint layer is 10 to 20 microns in thickness and the second colored paint layer is 10 to 20 microns in thickness.

4. The aluminum alloy coating according to claim 2, wherein the first prime coat layer is 20 to 40 microns in thickness and the second prime coat layer is 20 to 40 microns in thickness.

5. An aluminum alloy wheel hub, wherein a surface of the aluminum alloy wheel hub comprises the aluminum alloy coating according to claim 2.

6. A spraying method of an aluminum alloy wheel hub, wherein the method is applied to the aluminum alloy wheel hub according to claim 5, comprising:
spraying base powder to a pretreated surface of the aluminum alloy wheel hub to form the base powder layer;
spraying a first colored paint to the base powder layer to form the first colored paint layer;
spraying a first prime coat to the first colored paint layer to form the first prime coat layer;
spraying a second prime coat to the first prime coat layer to form the second prime coat layer;
spraying a second colored paint to the second prime coat layer to form the second colored paint layer; and
spraying transparent powder to the second colored paint layer to form the transparent powder layer.

7. The method according to claim 6, wherein before spraying the base powder to the pretreated surface of the aluminum alloy wheel hub, the method further comprises:
pretreating a surface of the aluminum alloy wheel hub, and the pretreatment at least comprises degreasing, water washing, acid washing, pure water washing, passivation and blocking.

8. The method according to claim 6, wherein the spraying of the first colored paint to the base powder layer and the spraying of the second colored paint to the second prime coat layer each comprise:
performing the spraying through an air gun under conditions of a distance of 180 to 250 mm between a spraying port and a surface to be sprayed, an atomization pressure of 2.0 to 4.0 bar of the air gun, a fan pressure of 1.0 to 4.0 bar, a paint dispensing rate of 50 to 300 cc/min, a temperature of 55 to 65° C. of the surface to be sprayed, a curing temperature of 130 to 150° C. and a heat preservation time of 15 to 25 min.

9. The method according to claim 6, wherein the spraying of the first prime coat to the first colored paint layer and the spraying of the second prime coat to the first prime coat layer each comprise:
performing the spraying through a rotating cup gun under conditions of a distance of 180 to 250 mm between a spraying port and a surface to be sprayed, a paint dispensing rate of 50 to 250 cc/min, a driving air pressure of 1.0 to 2.0 bar, a fan pressure of 1.0 to 2.0 bar, a static voltage of 30 to 60 kV, a temperature of 40 to 50° C. of the surface to be sprayed, a curing temperature of 140 to 160° C. and a curing time of 10 to 15 min.

10. The method according to claim 6, wherein the spraying of the base powder on the pretreated surface of the aluminum alloy wheel hub and the spraying of the transparent powder on the second colored paint layer each comprise:
performing electrostatic spraying under conditions of an electrostatic voltage of 30 to 80 kV, a powder spraying amount of 35 to 80%, a total gas volume of 3.5 to 5.0 m/h, a distance of 180 to 250 mm between a spraying port and the surface to be sprayed, a curing temperature of 170 to 180° C. and a curing time of 15 to 20 min.

* * * * *